United States Patent [19]

Reed

[11] Patent Number: 4,858,376
[45] Date of Patent: Aug. 22, 1989

[54] INSECT TRAP APPARATUS

[76] Inventor: Barry J. Reed, 4162 124th S. E. #301, Bellevue, Wash. 98006

[21] Appl. No.: 295,134

[22] Filed: Jan. 9, 1989

[51] Int. Cl.$^4$ ............................................. A01M 5/02
[52] U.S. Cl. ..................................................... 43/139
[58] Field of Search .......................................... 43/139

[56] References Cited

U.S. PATENT DOCUMENTS

| | | | |
|---|---|---|---|
| 454,720 | 6/1891 | Dexter | 43/139 |
| 3,214,861 | 11/1965 | Arthar | 43/139 |
| 4,074,458 | 2/1978 | Catlett | 43/139 |
| 4,175,352 | 11/1979 | Catlett | 43/139 |
| 4,449,319 | 5/1984 | Garcia | 43/139 |
| 4,607,451 | 8/1986 | Sarecki | 43/139 |
| 4,733,495 | 3/1988 | Winnicki | 43/139 |
| 4,780,986 | 11/1988 | Broomfield | 43/139 |

*Primary Examiner*—Gene P. Crosby
*Attorney, Agent, or Firm*—Leon Gilden

[57] ABSTRACT

An insect trap apparatus is set forth wherein a reversing motor is positioned rearwardly of a forwardly directed conduit to selectively create a vacuum or a pressure between the conduit to secure and subsequently eject a trapped insect therewithin. The apparatus includes a plurality of handles selectively securable between the conduit member and a battery pack to provide variable links and flexibilities in handle organizations.

7 Claims, 1 Drawing Sheet

U.S. Patent
Aug. 22, 1989
4,858,376
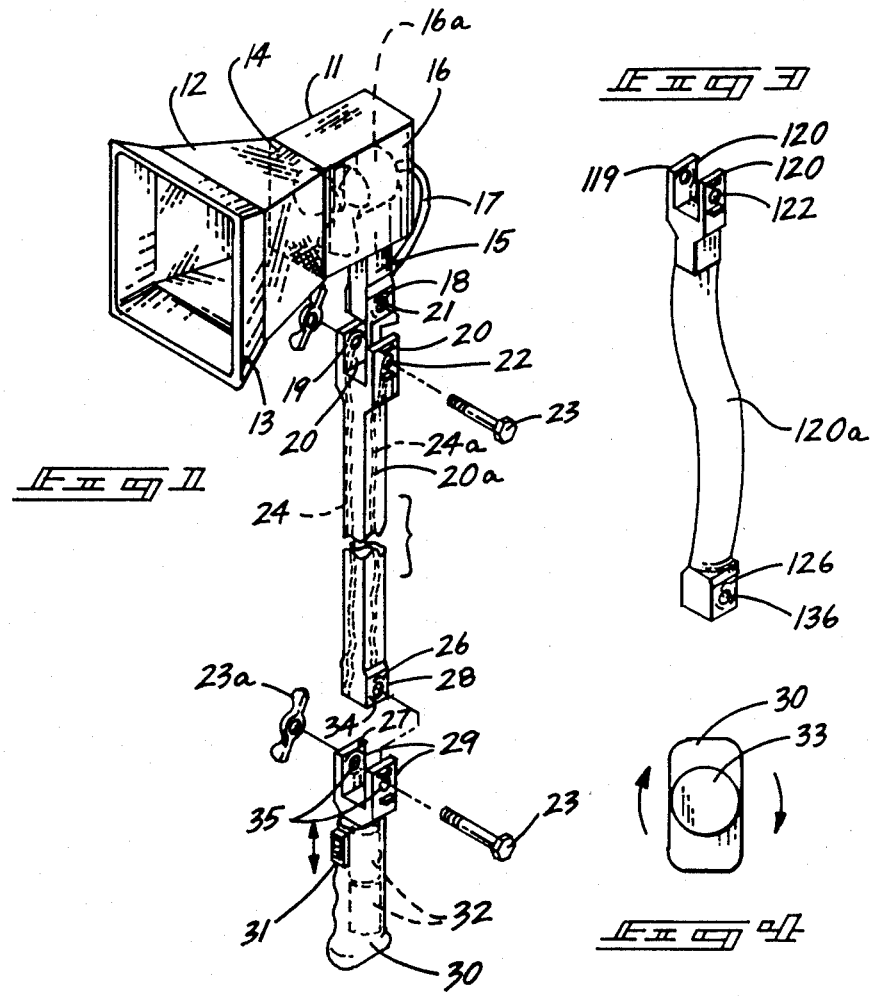
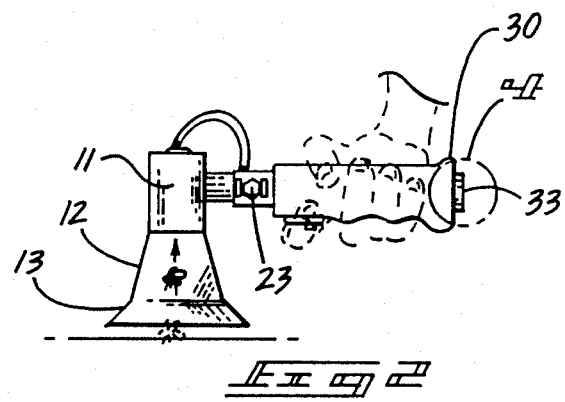

INSECT TRAP APPARATUS

BACKGROUND OF THE INVENTION

1. Field of the Invention

The field of invention relates to insect traps, and more particularly pertains to a new and improved insect trap apparatus wherein the same enables collective securement and ejection of insects trapped within the apparatus.

2. Description of the Prior Art

The use of vacuum operative insect traps has been utilized in the prior art. Heretofore, the traps of this class of invention have failed to provide a combination of features synergistic in use wherein various handles of varying lengths and relative manipulatability to enable use of the device in various physical environments. Furthermore, prior devices have failed to provide this combination in concert with a flexible lip directed outwardly of an associated vacuum conduit to enable the device to accommodate various surfaces when positioned thereon to trap insects by a user. For example, U.S. Pat. No. 3,214,861 to Arther sets forth an insect trap apparatus wherein the same sets forth a vacuum fan positioned in alignment with a plurality of batteries to draw in insects interiorly of a forwardly directed conduit for deposit within an underlying bag. The Arther patent is of a compact organization but fails to set forth the various handle lengths and resilient forward positions, as set forth by the instant invention.

U.S. Pat. No. 4,074,458 to Catlett sets forth a motorized vacuum unit provided with a pivotally mounted nozzle with a cage within to enable access of insects trapped within the nozzle. The instant invention varies significantly to the Catlett patent by providing a compact organization with a reversing motorized unit to dispense insects once captured therein to avoid the unnecessary appendage of a deposit bag within the nozzle and further provide the use of various handles associated with the apparatus to provide various lengths to enable access to insects at various vertical heights relative to a user.

U.S. Pat. No. 4,175,352 to Catlett sets forth a vacuum operative apparatus comparable to the aforenoted Catlett patent provided with a flexible conduit relative to a forwardly positioned nozzle.

U.S. Pat. No. 4,449,319 to Garcia sets forth a fly exterminating apparatus wherein a forwardly positioned nozzle directs a trapped flying insect rearwardly through the housing of the apparatus and impaling the insect at a rearwardly mounted screen. The Garcia patent fails to provide the flexible forward nozzle, associated adjustable length handle and forward flexible inlet lip of the instant invention.

U.S. Pat. No. 4,607,451 to Garecki sets forth a vacuum operated insect trap provided with the motorized vacuum unit positioned within the handle portion of the apparatus to direct insects therethrough into a collection bag thereunder.

As such, it may be appreciated that there continues to be a need for a new and improved insect trap apparatus wherein the same provides for vacuum securement and pressurized release of insects trapped therewithin of compact organization and provided with selectively positionable handles of varying lengths and flexibility and to enable access of the device to various portions of a living environment of an associated user.

SUMMARY OF THE INVENTION

In view of the foregoing disadvantages inherent in the known types of insect trap apparatus now present in the prior art, the present invention provides an insect trap apparatus wherein the same may be provided with varying length handles to enable access of the forwardly mounted flexible snout to accommodate various irregular surface portions of a living environment. As such, the general purpose of the present invention, which will be described subsequently in greater detail, is to provide a new and improved insect trap apparatus which has all the advantages of the prior art insect trap apparatus and none of the disadvantages.

To attain this, the present invention comprises an insect trap apparatus which is provided with selectively positioned handles between an associated battery operative handle and an overlying housing with the housing provided with a forwardly directed conduit and a peripheral lip of resilient construction. Further, the apparatus is provided with a reversible motor to effect vacuum and pressure within the conduit for trapping and subsequent release of associated insects.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved insect trap apparatus which has all the advantages of the prior art insect trap apparatus and none of the disadvantages.

It is another object of the present invention to provide a new and improved insect trap apparatus which may be easily and efficiently manufactured and marketed.

It is a further object of the present invention to provide a new and improved insect trap apparatus which is of a durable and reliable construction.

An even further object of the present invention is to provide a new and improved insect trap apparatus which is susceptible of a low cost of manufacture with regard to both materials and labor, and which accordingly is then susceptible of low prices of sale to the consuming public, thereby making such insect trap apparatus economically available to the buying public.

Still yet another object of the present invention is to provide a new and improved insect trap apparatus which provides in the apparatuses and methods of the prior art some of the advantages thereof, while simultaneously overcoming some of the disadvantages normally associated therewith.

Still another object of the present invention is to provide a new and improved insect trap apparatus wherein the same is provided with a reversible motor for securement and subsequent release of associated insects.

Still another object of the present invention is to provide a new and improved insect trap apparatus wherein the same is provided with a plurality of handles of varying lengths and flexibility to enable access of the overlying housing to various portions of the living environment of a user.

These together with the other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an exploded isometric illustration of the instant invention.

FIG. 2 is an orthographic view of the instant invention taken in elevation.

FIG. 3 is an isometric illustration of an alternative extension handle utilized by the instant invention.

FIG. 4 is an orthographic bottom plan view of the battery handle of the instant invention.

DESCRIPTION OF THE PREFERRED EMBODIMENT

With reference now to the drawings, and in particular to FIGS. 1 to 4 thereof, a new and improved insect trap apparatus embodying the principles and concepts of the present invention and generally designated by the reference numeral 10 will be described.

More specifically, it will be noted that the insect trap apparatus 10 essentially comprises a housing 11 formed with an outwardly directed conduit member 12. The conduit member 12 is formed with a resilient perimeter lip 13 extending and flaring outwardly of the perimeter of the conduit member 12 to accommodate deflection in presentation of the lip 13 adjacent an irregular surface. A screen 14 is formed between the communicating interface of the housing 11 and the conduit member 12 to prevent insects drawn interiorly of the conduit member 12 from entering the housing 11 containing a direct current reversible fan motor 16 formed with a series of impeller blades 16a whereupon the fan motor is vented rearwardly of the housing 11 through a series of apertures or openings of conventional configuration. Directed downwardly and orthogonally relative to the housing 11 is a shank 15 accepting an electrical connecting conduit 17 directed to the fan motor 16 wherein the electrical conduit terminates into a plurality of semi-circular first wiping contacts 18 overlying a first aperture 21 formed orthogonally through a lowermost portion of the shank 15 for cooperation with a second aperture 22 formed orthogonally through an upper end of a rigid elongate body member 20a. The second apertures 22 are formed through the bifurcated legs 20 which are in a parallel spaced relationship relative to one another and are spaced a distance apart substantially equal to that of the thickness of the lower end of the shank 15 and formed with semi-circular second wiping contacts 19 cooperating with the first contacts 18 to effect continuous electrical communication between the respective contacts 18 and 19. A connector 23 cooperates with a fastener 23a to selectively secure the housing 11 at a desired angulation relative to the elongate body member 20a.

The elongate body member 20a includes first and second electrical connectors 24 and 24a connecting the upper bifurcated legs 20 of member 20a with a lowermost shank portion containing a through-extending lower aperture 34 with a third semi-circular wiping contact 26 wherein each side of the shank face associated with each of the first and second electrical connections 24 and 24a cooperative with fourth semi-circular wiping contacts 27 formed over a handle opening 35 formed through each leg of second bifurcated legs 29. The second bifurcated legs 29 are of similar construction to the first bifurcated legs 20 to complementarily accept the lower shank of the member 20a rotatably therewithin wherein the fourth semi-circular wiping contacts 27 are electrically associated with batteries 32 positioned within the handle 30 underlying the second bifurcated legs to accept the lower shank faces 28 therewithin. In this manner, the electrical fan motor 16 is electrically associated with the batteries 32 through the first, second, third, and fourth wiping contacts and enable rotative angulation of the housing 11 with respect to the elongate body member 20a and the handle 30. The handle 30 is formed with a reversing switch 31 to reverse the rotation of the impellers 16a of the fan motor 16 to selectively create a vacuum or a pressure within the conduit member 12.

As illustrated in FIG. 2, a flying insect may thereby be drawn interiorly of the conduit member 12 and taken to a remote environment whereupon reversing of the fan motor 16 pressurizes the interior of the conduit member 12 and ejects the flying insect from within.

The batteries 32 are replaceable by means of a removable plug 33 formed within a lowermost surface of the handle 30.

Reference to FIG. 3 illustrates a modification of the elongate body member 20a wherein a flexible elongate body member 120a is set forth of memory retentent configuration such that upon manual manipulation of the flexible elongate body 120a, it will retain the said configuration. Similarly the body member 120a is formed with upper bifurcated legs 20 formed with through-extending apertures 122 and associated semi-circular wiping contacts 119 and lowermost wiping contacts 126 overlying a lowermost aperture 134 whereupon the apertures 122 and 134 are securable to the respective shank 15 and handle 30.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An insect trap apparatus comprising,
a housing enclosing a reversible motorized fan, and
a conduit member operatively associated with said motorized fan and rigidly connected to said housing, and
a shank integrally secured to said housing extending downwardly therefrom and including a first aperture, and
first contacts overlying opposed faces of said shank containing said first aperture and electrically associated with said motorized fan, and
a handle including an upwardly extending bifurcated portion including upwardly extending legs for complementarily and selectively accepting said shank between said legs, and
further contacts overlying handle apertures formed in said legs for electrically associating said further contacts with said motorized fan, and
a switch member for electrically reversing said motorized fan and battery means electrically associated with said switch and further contacts for electrically supplying electrical energy to said motorized fan, and
at least one fastening means for securing said shank to said handle.

2. An insect trap apparatus as set forth in claim 1 wherein a screen extends between an interface defined by the operative association of the housing and the conduit member for preventing insects within said conduit member from engagement with said motorized fan.

3. An insect trap apparatus as set forth in claim 2 wherein said apparatus further includes a rigid elongate body member wherein said body member is formed with upwardly extending member legs spaced for complementarily accepting said shank therebetween and formed with member leg apertures and member contacts overlying said member apertures for electrical association with said first contacts, and a lower member formed with a lower aperture formed with lower contacts for electrical association with said further contacts.

4. An insect trap apparatus as set forth in claim 3 wherein said first contacts, further contacts, upper member contacts and lower member contacts are of semi-circular configuration for enabling relative rotation between the housing, rigid elongate body member, and handle and maintaining electrical association between the battery means and motorized fan.

5. An insect trap apparatus as set forth in claim 4 wherein said apparatus further includes a flexible elongate member formed with a flexible bifurcated upper portion and a lower shank portion formed with a flexible body member of memory retentent material.

6. An insect trap apparatus as set forth in claim 5 wherein an outer peripheral end of said conduit member has formed thereto an outwardly extending and outwardly flaring resilient perimeter portion for resilient engagement with a surface for capture of an insect.

7. An insect trap apparatus as set forth in claim 6 wherein said handle is elongate and contains an inner removable plug for replacement of said battery members from within said handle.

* * * * *